(12) United States Patent
Miyazawa

(10) Patent No.: US 7,918,560 B2
(45) Date of Patent: Apr. 5, 2011

(54) PROJECTOR, PROJECTION SYSTEM, AND METHOD FOR GENERATING PIXEL VALUE IN PROJECTOR

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 438 days.

(21) Appl. No.: 12/050,570

(22) Filed: Mar. 18, 2008

(65) Prior Publication Data

US 2008/0304016 A1 Dec. 11, 2008

(30) Foreign Application Priority Data

Mar. 22, 2007 (JP) ................................. 2007-074125
Dec. 4, 2007 (JP) ................................. 2007-313143

(51) Int. Cl.
*H04N 9/31* (2006.01)
(52) U.S. Cl. ................. 353/20; 353/30; 353/31
(58) Field of Classification Search .................... 353/20, 353/30, 31
See application file for complete search history.

(56) References Cited

U.S. PATENT DOCUMENTS

| | | | | |
|---|---|---|---|---|
| 7,284,864 | B2 * | 10/2007 | Kobori et al. | 353/30 |
| 7,422,331 | B2 * | 9/2008 | Matsuda | 353/69 |
| 7,623,135 | B1 * | 11/2009 | Diamond et al. | 345/582 |
| 2009/0066723 | A1 | 3/2009 | Saito | |

FOREIGN PATENT DOCUMENTS

| | | |
|---|---|---|
| JP | A-01-126678 | 5/1989 |
| JP | A 03-294841 | 12/1991 |
| JP | A 04-175744 | 6/1992 |
| JP | A-05-107639 | 4/1993 |
| JP | A 05-224173 | 9/1993 |
| JP | A 2005-283658 | 10/2005 |
| JP | A 2007-43275 | 2/2007 |

* cited by examiner

*Primary Examiner* — Seung C Sohn
(74) *Attorney, Agent, or Firm* — Oliff & Berridge, PLC

(57) ABSTRACT

A projector includes an illuminator; a first image formation unit including a first optical unit having a light modulation element that modulates the light from the illuminator, the first image formation unit using the first optical unit to output first image light; a second image formation unit including a second optical unit having a light modulation element that modulates the light from the illuminator, the second image formation unit using the second optical unit to output second image light; a polarization combining system that combines the first image light outputted from the first image formation unit and the second image light outputted from the second image formation unit; a projection system that projects the image light combined by the polarization combining system; projection position adjusters that optically adjust the projection positions of the light modulation elements on a projection surface; and a pixel value generator that generates the pixel value for each pixel contained in the light modulation elements, the projection positions of which have been adjusted by the projection position adjusters, based on the projection position of the light from the pixel.

28 Claims, 11 Drawing Sheets

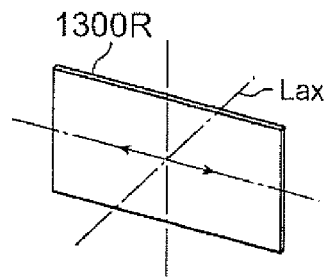
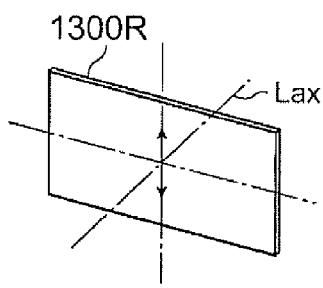
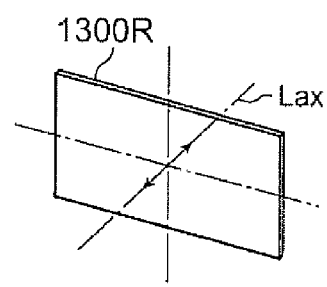
FIG. 3A     FIG. 3B     FIG. 3C
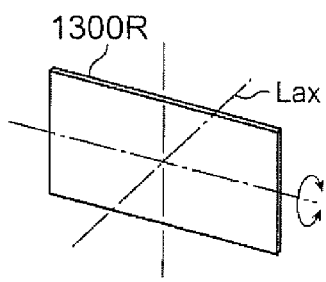
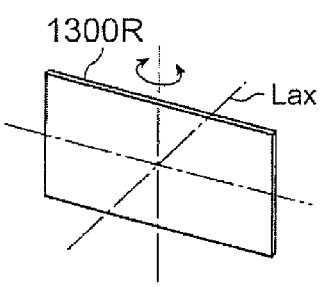
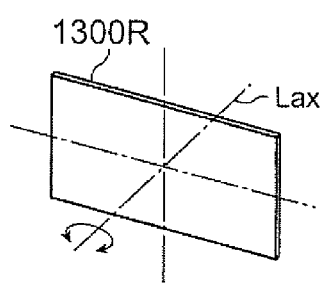
FIG. 3D     FIG. 3E     FIG. 3F
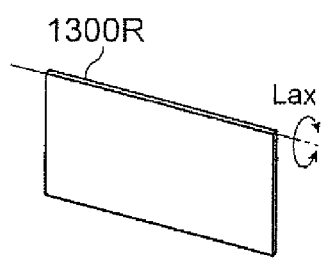
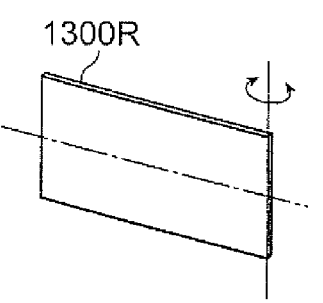
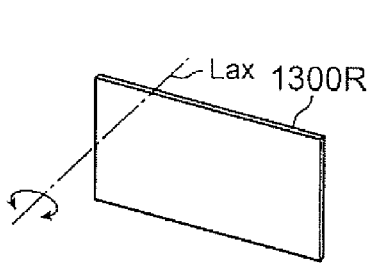
FIG. 3G     FIG. 3H     FIG. 3I $D_R = S_{R1(1)} \times D_{R1} + S_{R2(1)} \times D_{R2} + S_{R3(1)} \times D_{R3} + S_{R4(1)} \times D_{R4}$

FIG. 5A $D_G = S_{G1(1)} \times D_{G1} + S_{G2(1)} \times D_{G2} + S_{G3(1)} \times D_{G3} + S_{G4(1)} \times D_{G4}$

FIG. 5B $D_B = S_{B1(1)} \times D_{B1} + S_{B2(1)} \times D_{B2} + S_{B3(1)} \times D_{B3} + S_{B4(1)} \times D_{B4}$

FIG. 5C $D_R = S_{R1(2)} \times D_{R1}$

FIG. 6A $D_G = S_{G1(2)} \times D_{G1}$

FIG. 6B $D_B = S_{B1(2)} \times D_{B1} + S_{B2(2)} \times D_{B2} + S_{B3(2)} \times D_{B3} + S_{B4(2)} \times D_{B4}$

FIG. 6C

PROJECTOR, PROJECTION SYSTEM, AND METHOD FOR GENERATING PIXEL VALUE IN PROJECTOR

This application claims priority from Japanese Patent Application No. 2007-074125 filed in the Japanese Patent Office on Mar. 22, 2007 and Japanese Patent Application No. 2007-313143 filed in the Japanese Patent Office on Dec. 4, 2007, the entire disclosures of which are hereby incorporated by reference in their entireties.

BACKGROUND

1. Technical Field

The present invention relates to a projector, a projection system, and a method for generating pixel values in a projector.

2. Related Art

There has been known a method for using two projectors to project and overlay the same image on one screen (projection surface) (see JP-A-5-107639, for example). According to such a method, the brightness of the projected, overlaid image light is nearly doubled, and hence a high-brightness projected image can be achieved. Further, by projecting image light from two projectors in such a way that one of the images is displaced from the other by a half pixel, a high-definition projected image can be achieved.

In such overlay projection, however, it is not easy to accurately superimpose the image light from the two projectors on the screen. Inaccurate superimposition of the image light from the two projectors degrades the image quality of the projected image.

As a projector of related art capable of solving such a problem, there has been proposed a projector including a polarization separation system that separates the light from an illuminator into a light beam having a first polarization component and a light beam having a second polarization component and directs the resultant light beams toward two image formation units, and a polarization combining system that combines the image light beams from the two image formation units (see JP-A-1-126678, for example).

According to the projector of related art, the light from the illuminator is separated into the light beam having the first polarization component and the light beam having the second polarization component, and the image formation units form the image light beams. Then, the polarization combining system combines the two image light beams, and one projection system projects the combined light beam onto the screen. Therefore, provided that the two image formation units have been accurately positioned prior to shipping, the image light beams from the two image formation units can be accurately superimposed on the screen. As a result, it is possible to prevent reduction in image quality of the projected image.

In recent years, however, there is a need for a super high-definition, super-megapixel projector (such as a super-megapixel projector having 2K by 4K (2000 by 4000) pixels or 4K by 8K (4000 by 8000) pixels). In achieving such a super-megapixel projector, it has been found that there may be a problem of inaccurate projection of the light outputted from the image formation units on the projection surface (for example, when any possible positional alignment does not allow complete superimposition of the image light beams from the two image formation units on the projection surface, the pixels only in a specific area are not aligned on the projection surface) due to slightly insufficient accuracy in various optical elements (slight in-plane non-uniformity in a light modulation element (such as a liquid crystal panel) and accompanying optical elements (such as a polarizer and a viewing angle compensator), slight optical distortion and color aberration in the projection system, slightly insufficient accuracy in position and attitude of the light modulation element with respect to the projection system, and the like). Such a problem degrades the image quality of the projector. Such a problem can occur not only in a super-megapixel projector but also in an ordinary megapixel projector (a projector having 1080 by 1920 pixels and a projector having 720 pixel by 1280 pixels, for example).

SUMMARY

An advantage of some aspect of the invention is to provide a projector capable of preventing reduction in image quality even when the projector is a megapixel projector. An advantage of another aspect of the invention is to provide a projection system capable of preventing reduction in image quality even when the projection system uses a megapixel projector. Another advantage of some aspect of the invention is to provide a method for generating pixel values in a projector in order to achieve the above-mentioned projector.

A projector according to a first aspect of the invention includes an illuminator; a first image formation unit including a first optical unit having a light modulation element that modulates the light from the illuminator, the first image formation unit using the first optical unit to output first image light; a second image formation unit including a second optical unit having a light modulation element that modulates the light from the illuminator, the second image formation unit using the second optical unit to output second image light; a polarization combining system that combines the first image light outputted from the first image formation unit and the second image light outputted from the second image formation unit; a projection system that projects the image light combined by the polarization combining system; projection position adjusters that optically adjust the projection positions of the light modulation elements on a projection surface; and a pixel value generator that generates the pixel value for each pixel contained in the light modulation elements, the projection positions of which have been adjusted by the projection position adjusters, based on the projection position of the light from the pixel.

Since the projector according to the first aspect of the invention includes the projection position adjusters that optically adjust the projection positions of the light modulation elements on the projection surface, the first image light from the first image formation unit and the second image light from the second image formation unit can be superimposed on each other on the projection surface in a substantially accurate manner. The projector further includes the pixel value generator that generates the pixel value for each pixel contained in the light modulation elements, the projection positions of which have been adjusted by the projection position adjusters, based on the projection position of the light from that pixel. Therefore, even when the projection position of the light from each of the pixels is shifted due to slightly insufficient accuracy present in the optical elements, the pixel value for each of the pixels can be generated according to the projection position of the light from each of the shifted pixels. As a result, the projector according to the first aspect of the invention, even when it is a megapixel projector, can prevent reduction in image quality.

It is preferable that, when a hypothetical screen including a plurality of hypothetical pixels is defined on the projection surface, the pixel value generator generates the pixel value for each of the pixels contained in the light modulation elements based on pixel projection position information on which hypothetical pixels of the plurality of hypothetical pixels receive the projected light from the pixel and how much proportion of the light is projected.

In this case, the light from each of the pixels in each of the light modulation elements is not necessarily projected in such a way that the projected light just fits within (the area of) one hypothetical pixel of the plurality of hypothetical pixels on the projection surface, but it is conceivable that the light may be projected across two or more hypothetical pixels of the plurality of hypothetical pixels.

By employing the configuration described above, however, even in such a case, an appropriate pixel value can be generated for each of the pixels in each of the light modulation elements.

It is preferable that, when a hypothetical screen including a plurality of hypothetical pixels is defined on the projection surface, the projector also has a pixel projection position information generation function of generating pixel projection position information on which hypothetical pixels of the plurality of hypothetical pixels receive the projected light from each of the pixels contained in the light modulation elements and how much proportion of the light is projected, and a parameter generation function of generating a pixel value generation parameter based on the pixel projection position information generated by the pixel projection position information generation function.

By employing such a configuration, once the above functions of the projector have generated the pixel value generation parameter, the pixel value generator can use the pixel value generation parameter to generate the pixel value for each of the pixels.

It is preferable that the projector further includes a parameter storage section that stores the pixel value generation parameter generated based on the pixel projection position information, and the pixel value generator uses the pixel value generation parameter stored in the parameter storage section to generate the pixel value for each of the pixels.

By employing such a configuration, once the pixel value generation parameter has been generated based on the pixel projection position information, the pixel value generator can use the pixel value generation parameter stored in the parameter storage section to generate the pixel value for each of the pixels.

It is preferable that in the projector, the proportion is the proportion of the area of a hypothetical pixel.

By employing such a configuration, an appropriate pixel value can be generated for each of the pixels in each light modulation elements.

It is preferable that in the projector, the proportion is the proportion of the amount of light.

By employing such a configuration as well, an appropriate pixel value can be generated for each of the pixels in each light modulation elements.

It is preferable that the projector further includes an imaging element that images the projection position of the light from each of the pixels in the light modulation element in the first image formation unit and the light modulation element in the second image formation unit.

By employing such a configuration, the pixel value generator can generate the pixel value for each of the pixels based on the result of the imaging operation performed by the imaging element.

It is preferable that in the projector, the first image formation unit includes a color separation system that separates the light from the illuminator into three color light beams as well as the first optical unit including, as the light modulation element, three light modulation elements that modulate the three color light beams separated by the color separation system and a color combining system that combines the color light beams modulated by the three light modulation elements, and the second image formation unit includes a color separation system that separates the light from the illuminator into three color light beams as well as the second optical unit including, as the light modulation element, three light modulation elements that modulate the three color light beams separated by the color separation system and a color combining system that combines the color light beams modulated by the three light modulation elements.

Such a configuration allows the projector, even when it is a megapixel projector, to prevent reduction in image quality even when both the first and second image formation units are of three-panel type.

It is preferable that in the projector, the projection position adjusters are position adjustment devices that adjust the positions of the three light modulation elements in the first image formation unit and the three light modulation elements in the second image formation unit independent of each other with respect to six axes.

By employing such a configuration, the first image light from the first image formation unit and the second image light from the second image formation unit can be superimposed on each other on the projection surface in a substantially accurate manner.

It is preferable that in the projector, the projection position adjusters are position adjustment devices that adjust the positions of the first optical unit and the second optical unit independent of each other with respect to six axes.

By employing such a configuration as well, the first image light from the first image formation unit and the second image light from the second image formation unit can be superimposed on each other on the projection surface in a substantially accurate manner.

It is preferable that in the projector, the projection position adjusters include one or two light shift elements disposed between the first optical unit and the polarization combining system and/or between the second optical unit and the polarization combining system.

By employing such a configuration as well, the first image light from the first image formation unit and the second image light from the second image formation unit can be superimposed on each other on the projection surface in a substantially accurate manner.

It is preferable that the projector further includes a polarization separation/light guiding system including a polarization separation system that separates the light from the illuminator into light having a first polarization component and light having a second polarization component, a first light guiding system that guides the light having the first polarization component separated by the polarization separation system to the first image formation unit, and a second light guiding system that guides the light having the second polarization component separated by the polarization separation system to the second image formation unit.

By employing such a configuration, the light from the same illuminator can be used to generate the first image light and the second image light. The projector thus has high light usage efficiency.

It is preferable that in the projector, the illuminator includes a first illuminator that emits light toward the first image formation unit and a second illuminator that emits light toward the second image formation unit.

By employing such a configuration, the light from the first illuminator can be used to generate the first image light, and the light from the second illuminator can be used to generate the second image light. The projector thus has high brightness.

A projection system according to a second aspect of the invention includes a projector including an illuminator, a first image formation unit including a first optical unit having a light modulation element that modulates the light from the illuminator, the first image formation unit using the first optical unit to output first image light, a second image formation unit including a second optical unit having a light modulation element that modulates the light from the illuminator, the second image formation unit using the second optical unit to output second image light, a polarization combining system that combines the first image light outputted from the first image formation unit and the second image light outputted from the second image formation unit, a projection system that projects the image light combined by the polarization combining system, projection position adjusters that optically adjust the projection positions of the light modulation elements on a projection surface, and a pixel value generator that generates the pixel value for each pixel contained in the light modulation elements, the projection positions of which have been adjusted by the projection position adjusters, based on the projection position of the light from the pixel; an imaging element that images the projection position of the light from each of the pixels in the light modulation element in the first image formation unit and the light modulation element in the second image formation unit; and an electronic computer having, when a hypothetical screen including a plurality of hypothetical pixels is defined on the projection surface, a pixel projection position information generation function of generating, based on the result of the imaging operation performed by the imaging element, pixel projection position information on which hypothetical pixels of the plurality of hypothetical pixels receive the projected light from each of the pixels contained in the light modulation elements and how much proportion of the light is projected, and a parameter generation function of generating a pixel value generation parameter based on the pixel projection position information generated by the pixel projection position information generation function. The pixel value generator uses the pixel value generation parameter generated by the electronic computer to generate the pixel value for each of the pixels.

The projection system according to the second aspect of the invention thus includes the projector having the projection position adjusters and the pixel value generator, the imaging element that images the projection position of each of the pixels in each of the light modulation elements, and the electronic computer having the pixel projection position information generation function of generating the pixel projection position information based on the result of the imaging operation performed by the imaging element and the parameter generation function of generating the pixel value generation parameter based on the pixel projection position information. Therefore, even when the projection position of the light from each of the pixels is shifted due to slightly insufficient accuracy present in the optical elements disposed in the projector, the pixel value for each of the pixels can be generated according to the projection position of the light from each of the shifted pixels. As a result, the projection system according to the second aspect of the invention, even when it uses a megapixel projector, can prevent reduction in image quality.

It is preferable that in the projection system, the projector further includes a parameter storage section that stores the pixel value generation parameter generated by the electronic computer, and the pixel value generator uses the pixel value generation parameter stored in the parameter storage section to generate the pixel value for each of the pixels.

By employing such a configuration, once the pixel value generation parameter has been generated based on the pixel projection position information, the pixel value generator can use the pixel value generation parameter stored in the parameter storage section to generate the pixel value for each of the pixels.

A method for generating pixel values in a projector according to a third aspect of the invention is a method for generating pixel values in a projector including an illuminator, a first image formation unit including a first optical unit having a light modulation element that modulates the light from the illuminator, the first image formation unit using the first optical unit to output modulated first image light, a second image formation unit including a second optical unit having a light modulation element that modulates the light from the illuminator, the second image formation unit using the second optical unit to output modulated second image light, a polarization combining system that combines the first image light outputted from the first image formation unit and the second image light outputted from the second image formation unit, a projection system that projects the image light combined by the polarization combining system, projection position adjusters that optically adjust the projection positions of the light modulation elements on a projection surface, and a pixel value generator that generates the pixel value for each pixel contained in the light modulation elements, the projection positions of which have been adjusted by the projection position adjusters, based on the projection position of the light from the pixel, the method comprising in the following order: the first step of using the imaging element to image the projection position of the light from each of the pixels in the light modulation element in the first image formation unit and the light modulation element in the second image formation unit; and the second step of using the pixel value generator to generate the pixel value for each of the pixels based on the result of the imaging operation performed by the imaging element.

In the method for generating pixel values in a projector according to the third aspect of the invention, after the first image light from the first image formation unit and the second image light from the second image formation unit have been superimposed on each other on the projection surface in a substantially accurate manner by using the projection position adjusters, the first step is carried out by using the imaging element to image the projection position of each of the pixels in each of the light modulation elements, and the second step is carried out by generating the pixel value for each of the pixels in each of the thus imaged light modulation elements based on the projection position of the light from that pixel. Therefore, even when the projection position of the light from each of the pixels is shifted due to slightly insufficient accuracy present in the optical elements, the pixel value for each of the pixels can be generated according to the projection position of the light from each of the shifted pixels. As a result, the method for generating pixel values in a projector according to the third aspect of the invention, even when the method is used in a megapixel projector, can prevent reduction in image quality.

It is preferable that in the method for generating pixel values in a projector, in the second step, when a hypothetical screen including a plurality of hypothetical pixels is defined on the projection surface, the pixel value generator generates the pixel value for each of the pixels contained in the light modulation elements based on pixel projection position information on which hypothetical pixels of the plurality of hypothetical pixels receive the projected light from the pixel and how much proportion of the light is projected.

Such a method allows generation of an appropriate pixel value for each of the pixels in each of the light modulation elements.

It is preferable that in the method for generating pixel values in a projector, the second step includes, when a hypothetical screen including a plurality of hypothetical pixels is defined on the projection surface, the pixel projection position information generation step of generating pixel projection position information on which hypothetical pixels of the plurality of hypothetical pixels receive the projected light from each of the pixels contained in the light modulation elements and how much proportion of the light is projected based on the result of the imaging operation performed by the imaging element, and the parameter generation step of generating a pixel value generation parameter based on the pixel projection position information generated by carrying out the pixel projection position information generation step.

In such a method, the pixel value generator can generate the pixel value for each of the pixels by using the pixel value generation parameter obtained by carrying out the pixel projection position information generation step and the parameter generation step.

BRIEF DESCRIPTION OF THE DRAWINGS

The invention will now be described with reference to the accompanying drawings, wherein like numbers refer to like elements.

FIGS. 3A to 3I explain a position adjustment device;

FIGS. 5A to 5C explain the procedure for generating the pixel value for each pixel;

FIGS. 6A to 6C explain the procedure for generating the pixel value for each pixel;

DETAILED DESCRIPTION OF EMBODIMENTS

Figure 1:
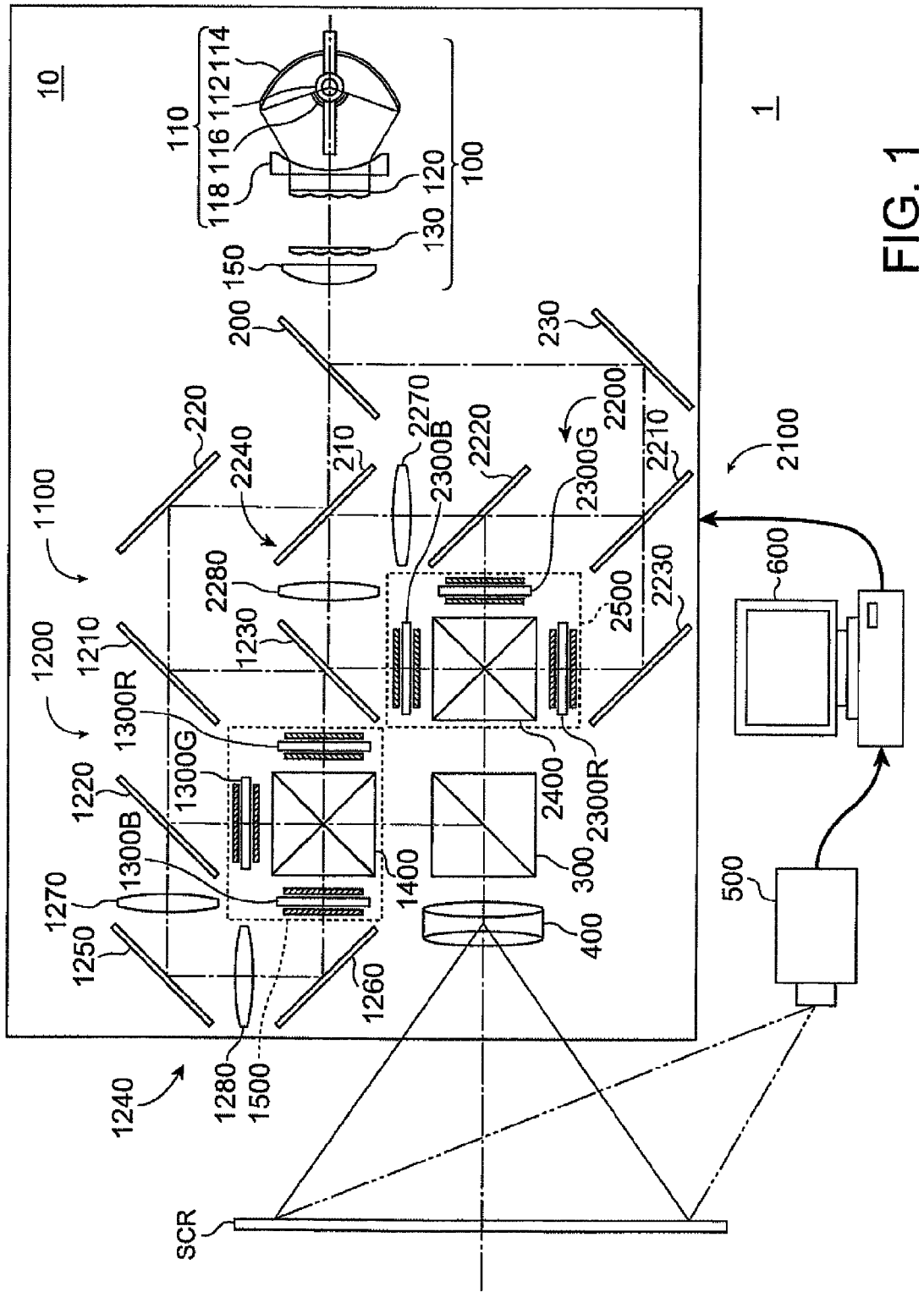
FIG. 1 explains a projection system 1 and a projector 10 according to a first embodiment.

A projector, a projection system, and a method for generating pixel values in a projector according to some aspects of the invention will be described below with reference to embodiments shown in the drawings.

First Embodiment

Figure 2:
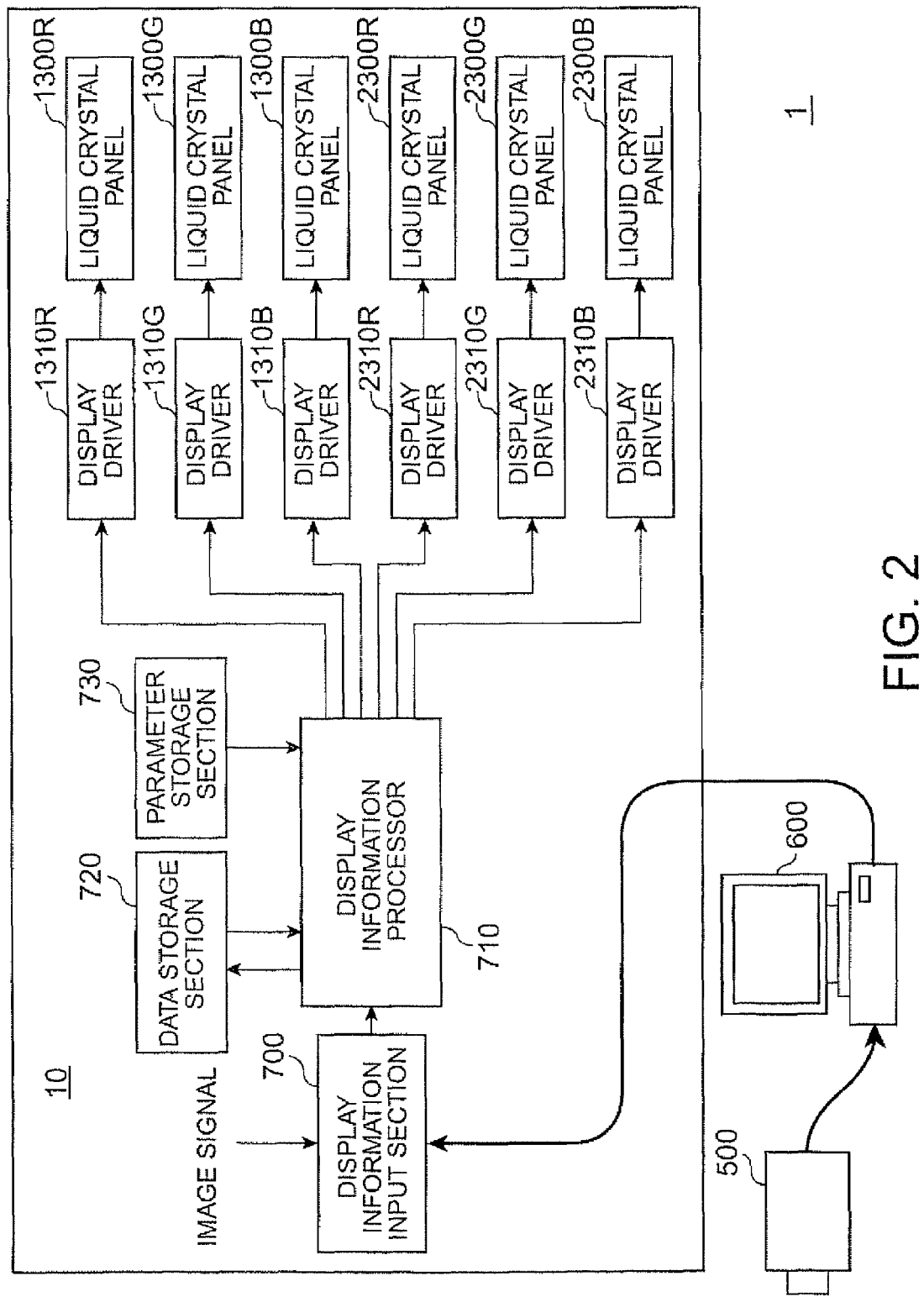
FIG. 2 explains the projection system 1 and the projector 10 according to the first embodiment.

FIGS. 1 and 2 explain a projection system 1 and a projector 10 according to a first embodiment.

The projection system 1 according to the first embodiment is a so-called rear projection-type projection system including the projector 10, an imaging element 500, and a PC 600 as an electronic computer, as shown in FIGS. 1 and 2.

1. Basic Configuration of the Projector 10

The projector 10 according to the first embodiment is a rear-type super-megapixel projector having 2K by 4K pixels (2000 rows by 4000 columns). As shown in FIG. 1, the projector 10 includes an illuminator 100, a first image formation unit 1100 that modulates the light from the illuminator 100 and outputs the modulated light as first image light, a second image formation unit 2100 that modulates the light from the illuminator 100 and outputs the modulated light as second image light, a polarization combining prism 300 as a polarization combining system that combines the first image light outputted from the first image formation unit 1100 and the second image light outputted from the second image formation unit 2100, and a projection system 400 that projects the image light combined by the polarization combining prism 300.

The illuminator 100 has a light source 110 that emits an illumination light flux toward the area to be illuminated, a first lens array 120 formed of first lenslets that divide the illumination flux emitted from the light source 110 into a plurality of partial light fluxes, a second lens array 130 formed of a plurality of second lenslets corresponding to the plurality of first lenslets in the first lens array 120, and a superimposing lens 150 that superimposes the partial light fluxes that exit from the second lens array 130 on the illuminated area.

The light source 110 has an ellipsoidal reflector 114, an arc tube 112, the emission center of which is located in the vicinity of the first focal point of the ellipsoidal reflector 114, a sub-mirror 116 that reflects the light emitted toward the area to be illuminated from the arc tube 112 back toward the arc tube 112, and a concave lens 118 that outputs the collected light from the ellipsoidal reflector 114 as substantially parallel light.

A polarization separation/light guiding system is disposed behind the illuminator 100. The polarization separation/light guiding system has a polarization separation mirror 200 as the polarization separation system that separates the light from the illuminator 100 into light containing a first polarization component (p-polarized light, for example) and light containing a second polarization component (s-polarized light, for example), a first light guiding system that guides the light containing the first polarization component separated by the polarization separation mirror 200 to the first image formation unit 1100, and a second light guiding system that guides the light containing the second polarization component separated by the polarization separation mirror 200 to the second image formation unit 2100.

The first image formation unit 1100 has a color separation system 1200 that separates the light from the illuminator 100 (the light containing the first polarization component) into three color light beams, and a first optical unit 1500 (not shown) including liquid crystal panels 1300R, 1300G, and 1300B as three light modulation elements that modulate the three light beams separated by the color separation system 1200 and a cross dichroic prism 1400 as a color combining system that combines the color light beams modulated by the three liquid crystal panels 1300R, 1300G, and 1300B.

The color separation system 1200 has dichroic mirrors 1210 and 1220, and a double-sided reflection mirror 1230. The color separation system 1200 has a function of separating the illumination light flux that exits from the superimposing lens 150 into the three color light beams, which are red, green, and blue light beams, and gliding the red and green light beams to the liquid crystal panels 1300R and 1300G and the blue light beam to a relay system 1240.

The light having the red light component reflected off the dichroic mirror 1210 is bent by the double-sided reflection mirror 1230 and then incident on the image formation area of the liquid crystal panel 1300R for red light. The light having the green light component, which, along with the light having the blue light component, passed through the dichroic mirror 1210, is reflected off the dichroic mirror 1220 and then incident on the image formation area of the liquid crystal panel 1300G for green light. On the other hand, the light having the blue light component passes through the dichroic mirror 1220 and enters the relay system 1240.

The relay system 1240 has a light incident-side lens 1270, a light incident-side reflection mirror 1250, a relay lens 1280, and a light exiting-side reflection mirror 1260. The relay system 1240 serves to glide the light having the blue light component that has passed through the dichroic mirror 1220 to the liquid crystal panel 1300B. The light having the blue light component that has entered the relay system 1240 passes through the light incident-side lens 1270, is bent by the reflection mirror 1250, is relayed through the relay lens 1280, is bent by the reflection mirror 1260, and is incident on the image formation area of the liquid crystal panel 1300B for blue light.

The second image formation unit 2100 has a color separation system 2200 that separates the light from the illuminator 100 (the light containing the second polarization component) into three color beams, and a second optical unit 2500 (not shown) including liquid crystal panels 2300R, 2300G, and 2300B as three light modulation elements that modulate the three light beams separated by the color separation system 2200 and a cross dichroic prism 2400 as a color combining system that combines the color light beams modulated by the three liquid crystal panels 2300R, 2300G, and 2300B.

The details of the color separation system 2200 and a relay system 2240 are the same as those in the first image formation unit 2100. The description thereof is therefore omitted.

2. Projection Position Adjuster

The projector 10 according to the first embodiment further includes six position adjustment devices (not shown) that adjust the positions of the three liquid crystal panels 1300R, 1300G, and 1300B in the first image formation unit 1100 and the three liquid crystal panels 2300R, 2300G, and 2300B in the second image formation unit 2100 independent of each other with respect to six axes. The six position adjustment devices serve as projection position adjusters that optically adjust the projection positions of the liquid crystal panels 1300R, 1300G, 1300B, 2300R, 2300G, and 2300B on a screen SCR as a projection surface.

FIGS. 3A to 3I explain the position adjustment device. FIGS. 3A to 3I show how the position adjustment device adjusts the position of the liquid crystal panel 1300R. The adjustment of the positions of the other liquid crystal panels 1300G, 1300B, 2300R, 2300G, and 2300B is carried out in the same manner.

The position adjustment device has a function of adjusting the position and attitude of the liquid crystal panel 1300R with respect to six axes. Specifically, as shown in FIGS. 3A to 3I, the liquid crystal panel 1300R can be moved in the following manner: translation in microsteps along two axes perpendicular not only to the optical axis Lax but also to each other (see FIGS. 3A and 3B), translation in microsteps along the optical axis Lax (see FIG. 3C), rotation in microsteps around two axes perpendicular not only to the optical axis Lax but also to each other (see FIGS. 3D and 3E), and rotation in microsteps around the optical axis Lax (see FIG. 3F).

When the position adjustment device adjusts the attitude of the liquid crystal panel 1300R, the liquid crystal panel 1300R may be rotated in microsteps around two axes that are perpendicular not only to the optical axis Lax but also to each other but do not intersect the optical axis Lax (see FIGS. 3G and 3H), or may be rotated in microsteps around an axis that is parallel to the optical axis Lax but does not coincide therewith (see FIG. 3I).

3. Pixel Value Generator

Figure 4A:
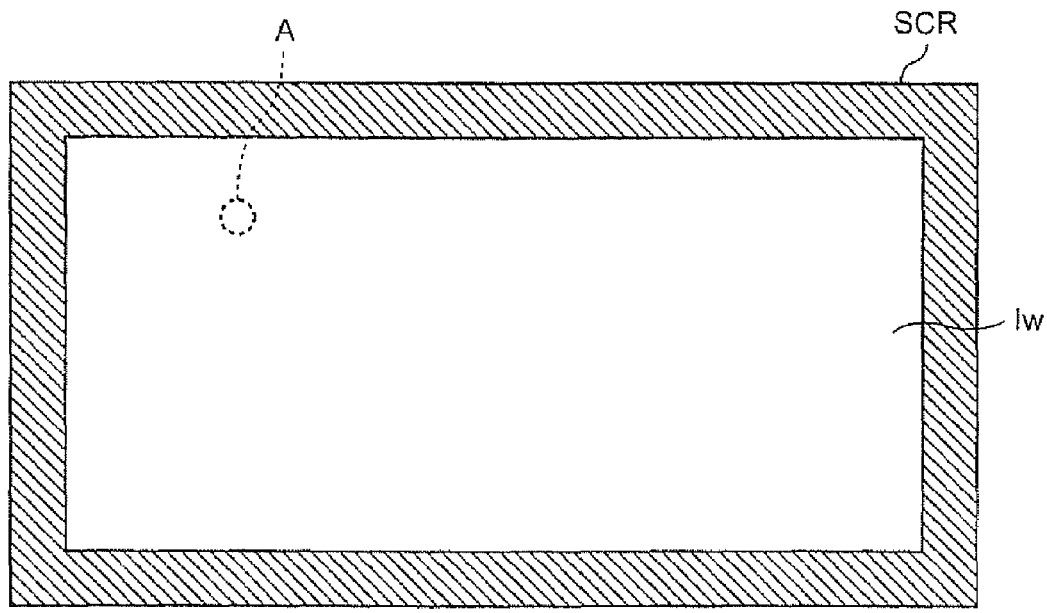
FIGS. 4A and 4B explain hypothetical pixels on a screen SCR.
Figure 4B:
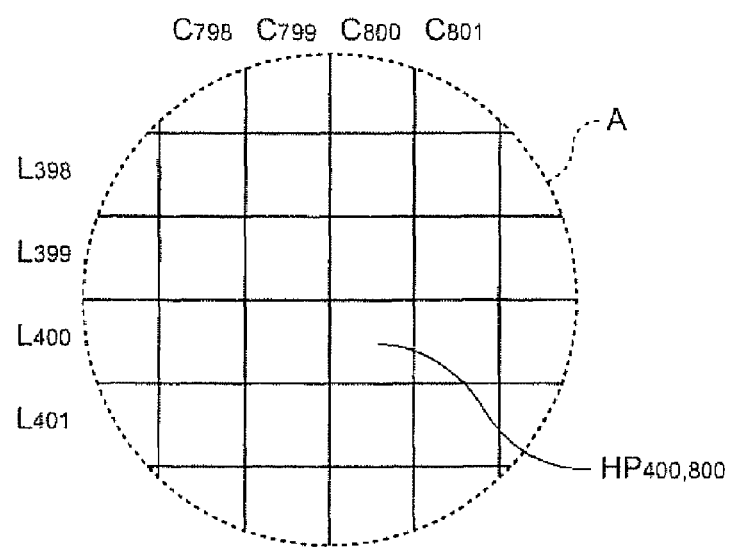

FIGS. 4A and 4B explain hypothetical pixels on the screen SCR. FIG. 4A explains a hypothetical screen Iw on the screen SCR, and FIG. 4B is an enlarged view of the portion indicated by the reference character A in FIG. 4A.

The projector 10 according to the first embodiment further includes a display information processor 710 as a pixel value generator that generates the pixel value for each pixel contained in each of the liquid crystal panels (liquid crystal panels 1300R, 1300G, 1300B, 2300R, 2300G, and 2300B) based on the pixel projection position of the light from that pixel.

The display information processor 710 has a function of generating the pixel value for each of the pixels by using a pixel value generation parameter generated by a pixel projection position information generation function and a parameter generation function, which will be described later, in the PC 600.

The imaging element 500 images the projection position of the light from each of the pixels in each of the three liquid crystal panels 1300R, 1300G, and 1300B in the first image formation unit 1100 and the three liquid crystal panels 2300R, 2300G, and 2300B in the second image formation unit 2100.

The PC 600 at least has the pixel projection position information generation function and the parameter generation function. The pixel projection position information generation function generates, when the hypothetical screen Iw (see FIGS. 4A and 4B) including a plurality of hypothetical pixels is defined on the screen SCR, pixel projection position information on which hypothetical pixels of the plurality of hypothetical pixels receive the projected light from each of the pixels contained in each of the liquid crystal panels (liquid crystal panels 1300R, 1300G, 1300B, 2300R, 2300G, and 2300B) and how much proportion of the area of each of the light-projected hypothetical pixels receives the projected light based on the result of the imaging operation performed by the imaging element 500. The parameter generation function generates the pixel value generation parameter based on the pixel projection position information generated by the pixel projection position information generation function.

A method for generating pixel values in a projector according to the first embodiment is a method for generating pixel values in the projector 10 described above, in which the following first and second steps are sequentially carried out. Each of the steps will be described below in order.

First Step

In the first step, the imaging element 500 is used to image the projection position of the light from each of the pixels in each of the three liquid crystal panels 1300R, 1300G, and 1300B in the first image formation unit 1100 and the liquid crystal panels 2300R, 2300G, and 2300B in the second image formation unit 2100.

Specifically, a test pattern (a stripe pattern, grid pattern, or dot pattern for each of the colors, for example) is projected from the projector 10 toward the screen SCR, and the test pattern projected on the screen SCR is imaged by the imaging element 500, Second Step In the second step, based on the result of the imaging operation performed by the imaging element 500, the display information processor 710 as the pixel value generator generates the pixel value for each of the pixels. The second step includes a pixel projection position information generation step and a parameter generation step, which will be described below.

Pixel Projection Position Information Generation Step

In the pixel projection position information generation step, the pixel projection position information on which hypothetical pixels of the plurality of hypothetical pixels receive the projected light from each of the pixels contained in each of the liquid crystal panels (liquid crystal panels 1300R, 1300G, 1300B, 2300R, 2300G, and 2300B) and how much proportion of the area of each of the light-projected hypothetical pixels receives the projected light is generated based on the result of the imaging operation performed by the imaging element 500. In the first embodiment, the PC 600 generates the pixel projection position information based on the result of the imaging operation performed by the imaging element 500.

Parameter Generation Step

In the parameter generation step, the pixel value generation parameter is generated based on the pixel projection position information generated by carrying out the pixel projection position information generation step. In the first embodiment, the PC 600 generates the pixel value generation parameter based on the pixel projection position information.

The pixel value generation parameter generated by the PC 600 is sent to the projector 10, and stored in a parameter storage section 730 via a display information input section 700 and the display information processor 710 shown in FIG. 2.

When the projector 10 according to the first embodiment is used to display an image, and an image signal to be displayed is inputted to the display information input section 700, the image signal is temporarily buffered as image data in a data storage section 720 via the display information processor 710. Then, the display information processor 710 uses the pixel value generation parameter stored in the parameter storage section 730 to generate the pixel value for each of the pixels.

After the second step, the pixel values in the image data buffered in the data storage section 720 are overwritten with the generated pixel values, and the corrected image data are outputted to display drivers 1310R, 1310G, 1310B, 2310R, 2310G, and 2310B. The liquid crystal panels 1300R, 1300G, 1300B, 2300R, 2300G, and 2300B carry out modulation according to the corrected image data.

The projection image from the projector 10 according to the first embodiment (image light from the projection system 400) is projected onto the screen SCR. As shown in FIGS. 4A and 4B, the hypothetical screen Iw has been defined on the screen SCR, and hypothetical pixels HP are arranged in a matrix (2000 rows by 4000 columns) on the hypothetical screen Iw (FIG. 4B only shows the hypothetical pixel $HP_{400, 800}$ at the 400th row and the 800th column).

Therefore, for example, predetermined pixels in the liquid crystal panels 1300R, 1300G, 1300B, 2300R, 2300G, and 2300B (for example, the pixel at the 400th row from the top and the 800th column from the left (pixel $P_{R(1)400, 800}$, pixel $P_{G(1)400, 800}$, pixel $PB_{R(1)400, 800}$, pixel $P_{R(2)400, 800}$, pixel $P_{G(2)400, 800}$, and pixel $P_{B(2)400, 800}$)) are desirably projected at the position of the hypothetical pixel $HP_{400, 800}$ on the hypothetical screen Iw. However, in the projector 10 according to the first embodiment, the above pixels may be projected at the positions of hypothetical pixels other than the hypothetical pixel $HP_{400, 800}$ on the hypothetical screen Iw due to slightly insufficient accuracy in the optical elements.

Even in such a case, however, the projector 10 according to the first embodiment generates the pixel value for each of the pixels contained in each of the liquid crystal panels 1300R, 1300G, 1300B, 2300R, 2300G, and 2300B based on the projection position of the light from that pixel.

FIG. 5A to 5C and 6A to 6C explain the procedure for generating the pixel value for each of the pixels. FIG. 5A shows the relationship between the area $P_{R(1)400, 800}$ where the light from the pixel $P_{400, 800}$ in the liquid crystal panel 1300R is projected and the hypothetical pixels in the hypothetical screen Iw. FIG. 5B shows the relationship between the area $P_{G(1)400, 800}$ where the light from the pixel $P_{400, 800}$ in the liquid crystal panel 1300G is projected and the hypothetical pixels in the hypothetical screen Iw. FIG. 5C shows the relationship between the area $P_{B(1)400, 800}$ where the light from the pixel $P_{400, 800}$ in the liquid crystal panel 1300B is projected and the hypothetical pixels in the hypothetical screen Iw.

FIG. 6A shows the relationship between the pixel $P_{R(2)400, 800}$ projected from the pixel $P_{400, 800}$ in the liquid crystal panel 2300R and the hypothetical pixels in the hypothetical screen Iw. FIG. 6B shows the relationship between the pixel $P_{G(2) 400, 800}$ projected from the pixel $P_{400, 800}$ in the liquid crystal panel 2300G and the hypothetical pixels in the hypothetical screen Iw. FIG. 6C shows the relationship between the pixel $P_{B(2) 400, 800}$ projected from the pixel $P_{400}, 800$ in the liquid crystal panel 2300B and the hypothetical pixels in the hypothetical screen Iw.

As shown in FIG. 5A, the display information processor 710 generates the pixel value $D_R$ for the pixel $P_{400, 800}$ contained in the liquid crystal panel 1300R by using the following equation:

$$D_{R1} \times S_{R1(1)} + D_{R2} \times S_{R2(1)} + D_{R3} \times S_{R3(1)} + D_{R4} \times S_{R4(1)}$$

where $D_{R1}, D_{R2}, D_{R3}$, and $D_{R4}$ are the red pixel values for the hypothetical pixels $HP_{399, 800}$, $HP_{400, 800}$, $HP_{400, 801}$, and $HP_{399, 801}$, respectively, and $S_{R1(1)}$, $S_{R2(1)}$, $S_{R3(1)}$, and $S_{R4(1)}$ are the proportions of the areas of the hypothetical pixels $HP_{399, 800}$, $HP_{400, 800}$, $HP_{400, 801}$, and $HP_{399, 801}$, respectively, onto which the light from the pixel $P_{400, 800}$ contained in the liquid crystal panel 1300R is projected.

As shown in FIG. 5B, the display information processor 710 generates the pixel value $D_G$ for the pixel $P_{400, 800}$ contained in the liquid crystal panel 1300G by using the following equation:

$$D_{G1} \times S_{G1(1)} + D_{G2} \times S_{G2(1)} + D_{G3} \times S_{G3(1)} + D_{G4} \times S_{G4(1)}$$

where $D_{G1}, D_{G2}, D_{G3}$, and $D_{G4}$ are the green pixel values for the hypothetical pixels $HP_{399, 800}$, $HP_{400, 800}$, $HP_{400, 801}$, and $HP_{399, 801}$, respectively, and $S_{G1(1)}$, $S_{G2(1)}$, $S_{G3(1)}$, and $S_{G4(1)}$ are the proportions of the areas of the hypothetical pixels $HP_{399, 800}$, $HP_{400, 800}$, $HP_{400, 801}$, and $HP_{399, 801}$, respectively, onto which the light from the pixel $P_{400, 800}$ contained in the liquid crystal panel 1300G is projected.

As shown in FIG. 5C, the display information processor 710 generates the pixel value $D_B$ for the pixel $P_{400, 800}$ contained in the liquid crystal panel 1300B by using the following equation:

$$D_{B1} \times S_{B1(1)} + D_{B2} \times S_{B2(1)} + D_{B3} \times S_{B3(1)} + D_{B4} \times S_{B4(1)}$$

where $D_{B1}, D_{B2}, D_{B3}$, and $D_{B4}$ are the blue pixel values for the hypothetical pixels $HP_{399, 800}$, $HP_{400, 800}$, $HP_{400, 801}$, and $HP_{399, 801}$, respectively, and $S_{B1(1)}$, $S_{B2(1)}$, $S_{B3(1)}$, and $S_{B4(1)}$ are the proportions of the areas of the hypothetical pixels $HP_{399, 800}$, $HP_{400, 800}$, $HP_{400, 801}$, and $HP_{399, 801}$, respectively, onto which the light from the pixel $P_{400, 800}$ contained in the liquid crystal panel 1300B is projected.

As shown in FIG. 6A, the display information processor 710 generates the pixel value $D_R$ for the pixel $P_{400,\,800}$ contained in the liquid crystal panel 2300R by using the following equation:

$$D_{R1} \times S_{R1(2)} (= D_{R1})$$

where $D_{R1}$ is the red pixel value for the hypothetical pixel $HP_{400,\,800}$, and $S_{R1(2)}$ is the proportion of the area of the hypothetical pixel $HP_{400,\,800}$ onto which the light from the pixel $P_{400,\,800}$ contained in the liquid crystal panel 2300R is projected.

As shown in FIG. 6B, the display information processor 710 generates the pixel value $D_G$ for the pixel $P_{400,\,800}$ contained in the liquid crystal panel 2300G by using the following equation:

$$D_{G1} \times S_{G1(2)} (= D_{G1})$$

where $D_{G1}$ is the green pixel value for the hypothetical pixel $HP_{400,\,800}$, and $S_{G1(2)}$ is the proportion of the area of the hypothetical pixel $HP_{400,\,800}$ onto which the light from the pixel $P_{401,\,800}$ contained in the liquid crystal panel 2300G is projected.

As shown in FIG. 6C, the display information processor 710 generates the pixel value $D_B$ for the pixel $P_{400,\,800}$ contained in the liquid crystal panel 2300B by using the following equation:

$$D_{B1} \times S_{B1(2)} + D_{B2} \times S_{B2(2)} + D_{B3} \times S_{B3(2)} + D_{B4} \times S_{B4(2)}$$

where $D_{B1}$, $D_{B2}$, $D_{B3}$, and $D_{B4}$ are the blue pixel values for the hypothetical pixels $HP_{400,\,800}$, $HP_{401,\,800}$, $HP_{401,\,801}$, and $HP_{400,\,801}$, respectively, and $S_{B1(2)}$, $S_{B2(2)}$, $S_{B3(2)}$, and $S_{B4(2)}$ are the proportions of the areas of the hypothetical pixels $HP_{400,\,800}$, $HP_{401,\,800}$, $HP_{401,\,801}$, and $HP_{400,\,801}$, respectively, onto which the light from the pixel $P_{400,\,800}$ contained in the liquid crystal panel 2300B is projected.

In the thus configured projector 10 according to the first embodiment, since the six position adjustment devices are provided as the projection position adjusters that optically adjust the projection positions of the liquid crystal panels 1300R, 1300G, 1300B, 2300R, 2300G, and 2300B on the screen SCR, the first image light from the first image formation unit 1100 and the second image light from the second image formation unit 2100 can be superimposed on each other on the screen SCR in a substantially accurate manner. Further, the display information processor 710 is provided as the pixel value generator that generates the pixel value for each of the pixels contained in each of the liquid crystal panels, the projection positions of which have been adjusted by the position adjustment devices, based on the projection position of the light from that pixel. Therefore, even when the projection position of the light from each of the pixels is shifted due to slightly insufficient accuracy present in the optical elements in the projector 10, the pixel value for each of the pixels can be generated according to the projection position of the light from each of the shifted pixels. As a result, the projector 10 according to the first embodiment, even when it is a megapixel projector, can prevent reduction in image quality.

Further, in the projector 10 according to the first embodiment, the display information processor 710 generates the pixel value for each of the pixels contained in each of the liquid crystal panels based on, when the hypothetical screen Iw including a plurality of hypothetical pixels is defined on the screen SCR, the pixel projection position information on which hypothetical pixels of the plurality of hypothetical pixels receive the projected light from that pixel and how much proportion of the area of each of the light-projected hypothetical pixels receives the projected light. It is therefore always possible to generate an appropriate pixel value for each of the pixels in each of the liquid crystal panels.

Moreover, the projector 10 according to the first embodiment further includes the parameter storage section 730 that stores the pixel value generation parameter, and the display information processor 710 uses the pixel value generation parameter stored in the parameter storage section 730 to generate the pixel value for each of the pixels. Therefore, once the pixel value generation parameter has been generated, the pixel value generation parameter stored in the parameter storage section 730 can be used to generate the pixel value for each of the pixels.

Since the projector 10 according to the first embodiment includes the six position adjustment devices that adjust the positions of the three liquid crystal panels 1300R, 1300G, and 1300B in the first image formation unit 1100 and the three liquid crystal panels 2300R, 2300G, and 2300B in the second image formation unit 2100 independent of each other with respect to the six axes, the first image light from the first image formation unit 1100 and the second image light from the second image formation unit 2100 can be superimposed on each other on the screen SCR in a substantially accurate manner.

Since the projector 10 according to the first embodiment further includes the polarization separation/light guiding system described above, the light from the same illuminator can be used to generate the first image light and the second image light. The projector thus has high light usage efficiency.

The projection system 1 according to the first embodiment includes the projector 10 including the six position adjustment devices and the display information processor 710, the imaging element 500 that images the projection position of each of the pixels in each of the liquid crystal panels, and the PC 600 having the pixel projection position information generation function of generating the pixel projection position information based on the result of the imaging operation performed by the imaging element 500 and the parameter generation function of generating the pixel value generation parameter based on the pixel projection position information. Therefore, even when the projection position of the light from each of the pixels is shifted due to slightly insufficient accuracy present in the optical elements disposed in the projector 10, the pixel value for each of the pixels can be generated according to the projection position of the light from each of the shifted pixels. As a result, the projection system according to the first embodiment, even when it uses a megapixel projector, can prevent reduction in image quality.

In the projection system 1 according to the first embodiment, the projector 10 further includes the parameter storage section 730 that stores the pixel value generation parameter generated by the PC 600, and the display information processor 710 uses the pixel value generation parameter stored in the parameter storage section 730 to generate the pixel value for each of the pixels. Therefore, once the pixel value generation parameter has been generated based on the pixel projection position information, the display information processor 710 can use the pixel value generation parameter stored in the parameter storage section 730 to generate the pixel value for each of the pixels.

In the method for generating pixel values in a projector according to the first embodiment, after the first image light from the first image formation unit 1100 and the second image light from the second image formation unit 2100 have been superimposed on each other on the screen SCR in a substantially accurate manner by using the six position adjustment devices as the projection position adjusters, the first step is carried out by using the imaging element 500 to image the projection position of each of the pixels in each of the liquid crystal panels, and the second step is carried out by generating the pixel value for each of the pixels in each of the thus imaged liquid crystal panels based on the projection position of the light from that pixel. Therefore, even when the projection position of the light from each of the pixels is shifted due to slightly insufficient accuracy present in the optical elements, the pixel value for each of the pixels can be generated according to the projection position of the light from each of the shifted pixels. As a result, the method for generating pixel values in a projector according to the first embodiment, even when the projector is a megapixel projector, can prevent reduction in image quality.

In the method for generating pixel values in a projector according to the first embodiment, in the second step, the display information processor 710 generates the pixel value for each of the pixels based on, when the hypothetical screen Iw including a plurality of hypothetical pixels is defined on the screen SCR, the pixel projection position information on which hypothetical pixels of the plurality of hypothetical pixels receive the projected light from each of the pixels contained in each of the liquid crystal panels and how much proportion of the area of each of the light-projected hypothetical pixels receives the projected light. It is therefore possible to generate an appropriate pixel value for each of the pixels in each of the liquid crystal panels.

In the method for generating pixel values in a projector according to the first embodiment, the second step includes the pixel projection position information generation step of generating the pixel projection position information based on the result of the imaging operation performed by the imaging element 500 and the parameter generation step of generating the pixel value generation parameter based on the generated pixel projection position information. The display information processor 710 can use the pixel value generation parameter obtained by carrying out the pixel projection position information generation step and the parameter generation step so as to generate the pixel value for each of the pixels.

Second Embodiment

Figure 7:
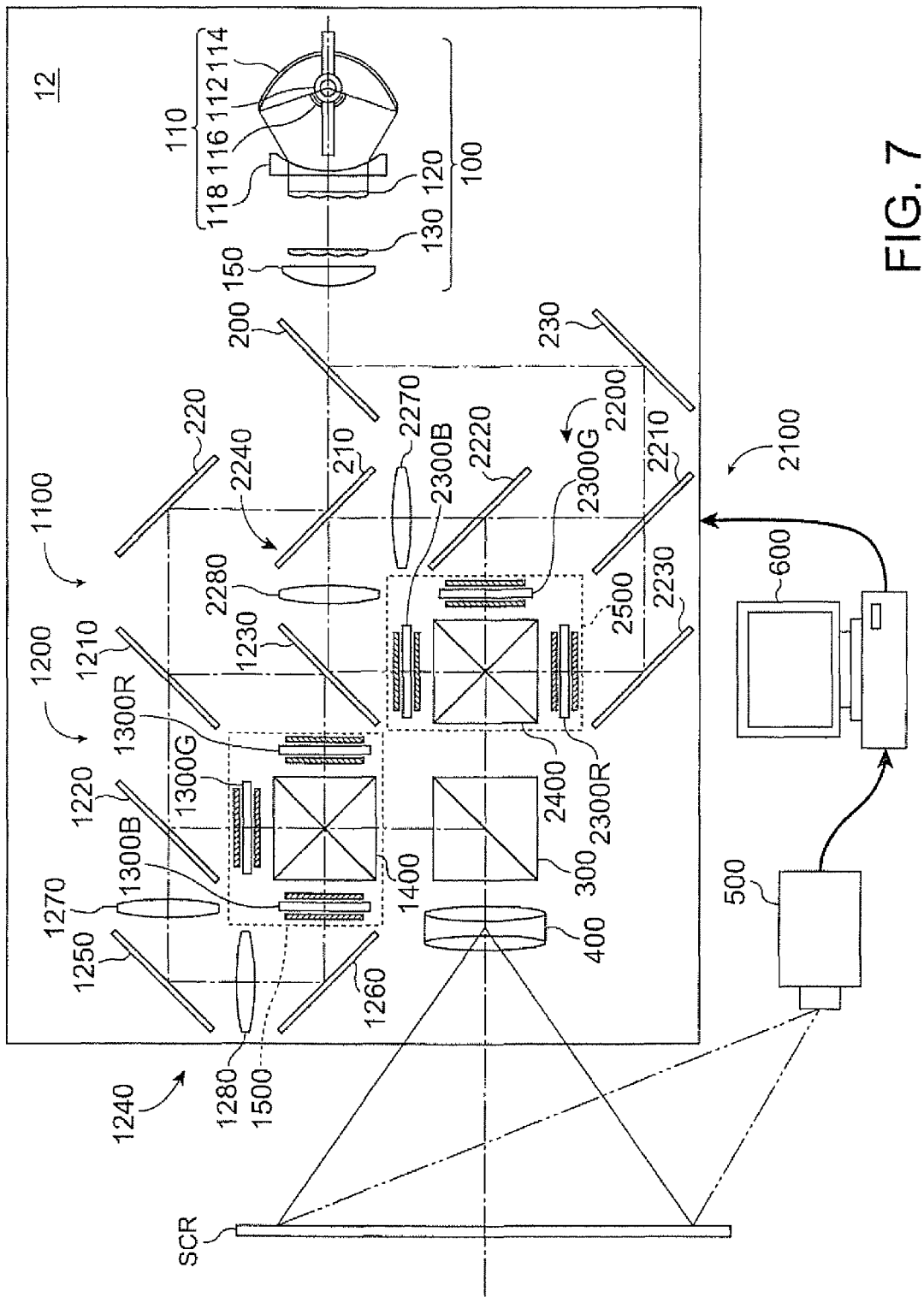
FIG. 7 explains a projector 12 according to a second embodiment.

FIG. 7 explains a projector 12 according to a second embodiment. In FIG. 7, the same members as those in FIG. 1 have the same reference numbers or characters, and no detailed description thereof will be made.

The projector 12 according to the second embodiment basically has a configuration fairly similar to that of the projector 10 according to the first embodiment, but differs therefrom in terms of the configuration of the projection position adjuster.

That is, the projector 12 according to the second embodiment includes two position adjustment devices as the projection position adjusters as shown in FIG. 7. The two position adjustment devices independently adjust the positions of the first optical unit 1500 in the first image formation unit 1100 and the second optical unit 2500 in the second image formation unit 2100 with respect to six axes.

Each of the two position adjustment devices has a function of adjusting the position and attitude of the corresponding one of the optical units 1500 and 2500 with respect to six axes. Specifically, the optical units 1500 and 2500 can be moved in the following manner: translation in microsteps along two axes perpendicular not only to the optical axis of the light that exits from the corresponding one of the cross dichroic prisms 1400 and 2400 but also to each other, translation in microsteps along the optical axis, rotation in microsteps around two axes perpendicular not only to the optical axis but also to each other, and rotation in microsteps around the optical axis.

As described above, while the projector 12 according to the second embodiment differs from the projector 10 according to the first embodiment in terms of the configuration of the projection position adjuster, the projector 12 further includes the display information processor 710 (not shown) as the pixel value generator that generates the pixel value for each of the pixels contained in each of the liquid crystal panels 1300R, 1300G, 1300B, 2300R, 2300G, and 2300B, the projection positions of which have been adjusted by the two position adjustment devices, based on the projection position of the light from that pixel, as in the projector 10 according to the first embodiment. Therefore, even when the projection position of the light from each of the pixels is shifted due to slightly insufficient accuracy present in the optical elements in the projector 12, the pixel value for each of the pixels can be generated according to the projection position of the light from each of the shifted pixels. As a result, the projector 12 according to the second embodiment, even when it is a megapixel projector, can prevent reduction in image quality, as in the projector 10 according to the first embodiment.

Since the projector 12 according to the second embodiment has a configuration similar to that of the projector 10 according to the first embodiment except that the configuration of the projection position adjuster is different, among the advantageous effects provided in the projector 10 according to the first embodiment, those relevant to the projector 12 according to the second embodiment are provided in the same manner.

Third Embodiment

Figure 8:
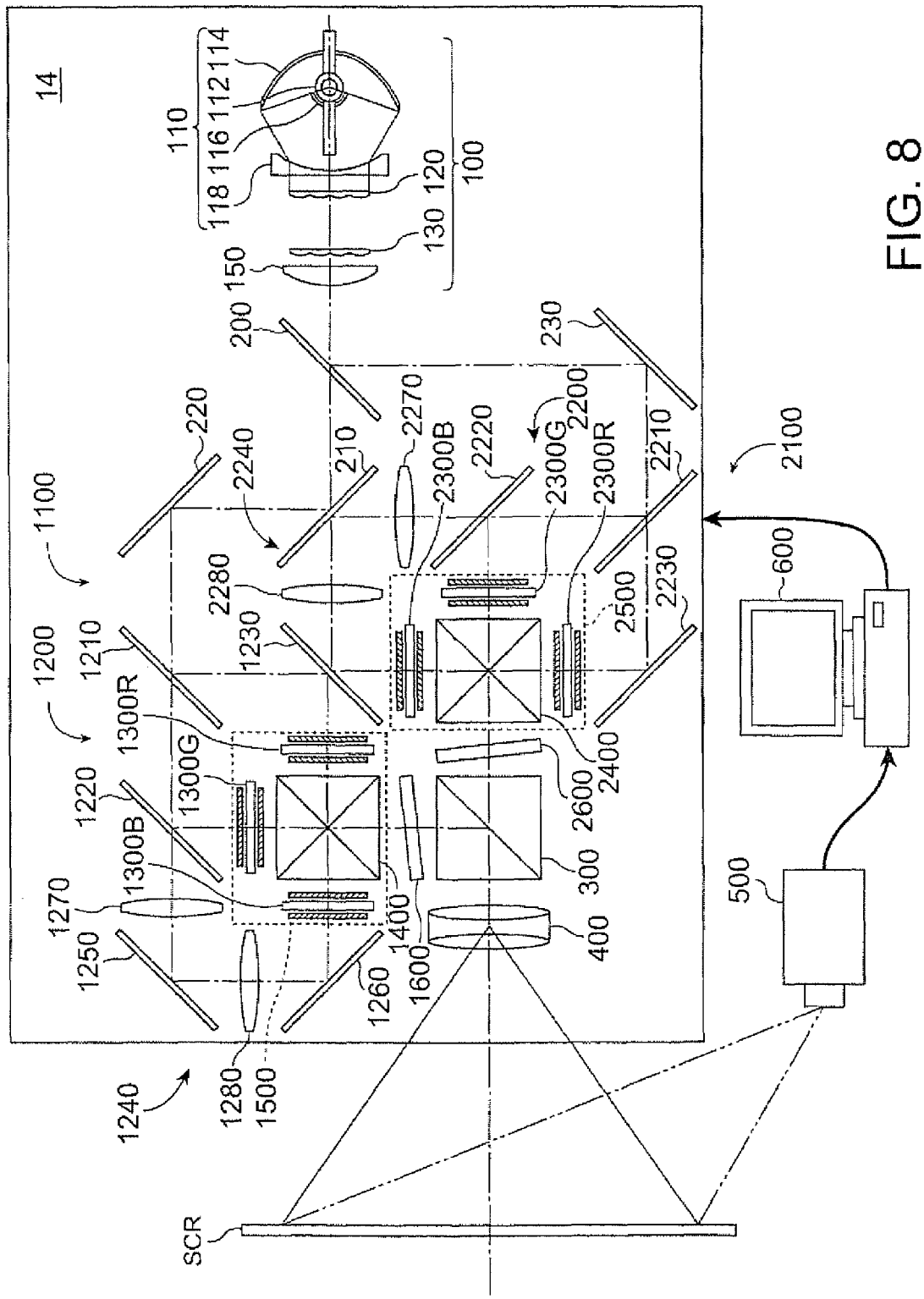
FIG. 8 explains a projector 14 according to a third embodiment.

FIG. 8 explains a projector 14 according to a third embodiment. In FIG. 8, the same members as those in FIG. 1 have the same reference numbers or characters, and no detailed description thereof will be made.

The projector 14 according to the third embodiment basically has a configuration fairly similar to that of the projector 10 according to the first embodiment, but differs therefrom in terms of the configuration of the projection position adjuster.

That is, the projector 14 according to the third embodiment includes two light shift elements 1600 and 2600 as the projection position adjusters as shown in FIG. 8. The two light shift elements 1600 and 2600 are disposed between the first optical unit 1500 in the first image formation unit 1100 and the polarization combining prism 300 and between the second optical unit 2500 in the second image formation unit 2100 and the polarization combining prism 300, respectively.

Figure 9A:
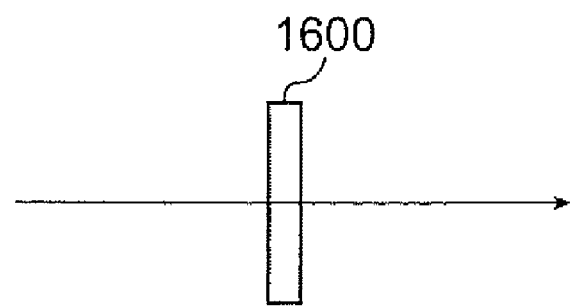
FIGS. 9A to 9C explain a light shift element.
Figure 9B:
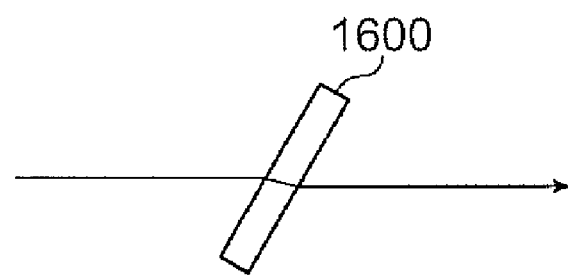
Figure 9C:
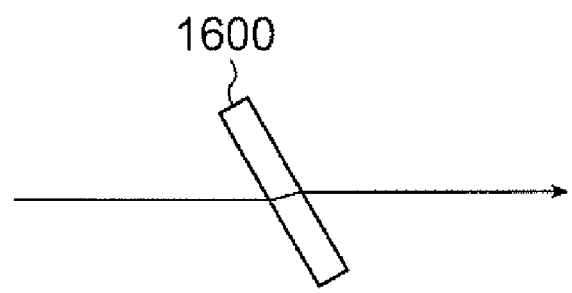

FIGS. 9A to 9C explain the light shift element. FIGS. 9A to 9C show the light shift element 1600. The light shift element 2600 works in the same way as the light shift element 1600.

The light shift element 1600 has a function of translating the light flux (and its optical axis) that passes through the light shift element 1600 by an arbitrary amount when the light shift element 1600 is inclined to the optical axis by a predetermined angle. Specifically, when the light shift element 1600 is disposed perpendicular to the optical axis, the light flux (and its optical axis) that passes through the light shift element 1600 does not shift, as shown in FIG. 9A. However, when the light shift element 1600 is disposed to be inclined to the optical axis by a predetermined angle, the light flux (and its optical axis) that passes through the light shift element 1600 can be translated by a predetermined amount, as shown in FIGS. 9B and 9C.

As described above, while the projector 14 according to the third embodiment differs from the projector 10 according to the first embodiment in terms of the configuration of the projection position adjuster, the projector 14 further includes the display information processor 710 (not shown) as the pixel value generator that generates the pixel value for each of the pixels contained in each of the liquid crystal panels 1300R, 1300G, 1300B, 2300R, 2300G, and 2300B, the projection positions of which have been adjusted by the two light shift elements 1600 and 2600, based on the projection position of the light from that pixel, as in the projector 10 according to the first embodiment. Therefore, even when the projection position of the light from each of the pixels is shifted due to slightly insufficient accuracy present in the optical elements in the projector 14, the pixel value for each of the pixels can be generated according to the projection position of the light from each of the shifted pixels. As a result, the projector 14 according to the third embodiment, even when it is a megapixel projector, can prevent reduction in image quality, as in the projector 10 according to the first embodiment.

Since the projector 14 according to the third embodiment has a configuration similar to that of the projector 10 according to the first embodiment except that the configuration of the projection position adjuster is different, among the advantageous effects provided in the projector 10 according to the first embodiment, those relevant to the projector 14 according to the third embodiment are provided in the same manner.

Fourth Embodiment

Figure 10:
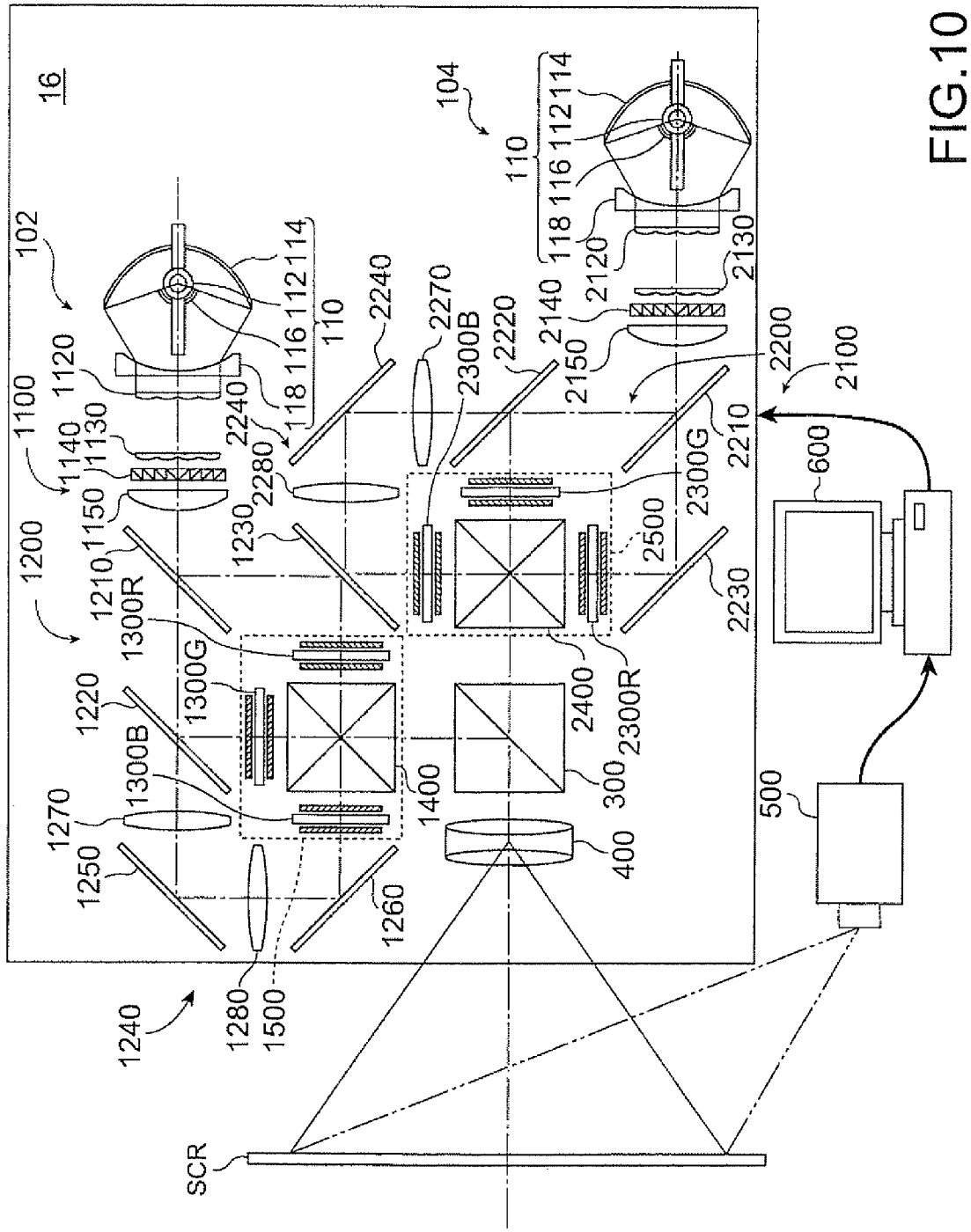
FIG. 10 explains a projector 16 according to a fourth embodiment.

FIG. 10 explains a projector 16 according to a fourth embodiment. In FIG. 10, the same members as those in FIG. 1 have the same reference numbers or characters, and no detailed description thereof will be made.

The projector 16 according to the fourth embodiment basically has a configuration fairly similar to that of the projector 10 according to the first embodiment, but differs therefrom in terms of the configuration of the illuminator.

That is, the projector 16 according to the fourth embodiment includes, as the illuminator, a first illuminator 102 that emits light toward the first image formation unit 1100 and a second illuminator 104 that emits light toward the second image formation unit 2100, as shown in FIG. 10.

Each of the first and second illuminators 102 and 104 has a configuration fairly similar to that of the illuminator 100 described in the first embodiment, but differs therefrom in that each of the first and second illuminators 102 and 104 further includes a polarization conversion element.

That is, the first illuminator 102 has a light source 110 that emits an illumination flux toward the area to be illuminated, a first lens array 1120 formed of first lenslets that divide the illumination flux emitted from the light source 10 into a plurality of partial light fluxes, a second lens array 1130 formed of a plurality of second lenslets corresponding to the plurality of first lenslets in the first lens array 1120, a polarization conversion element 1140 that converts the partial light fluxes that exit from the second lens array 1130 into partial light fluxes, each having a first polarization component, and outputs the converted partial light fluxes, and a superimposing lens 1150 that superimposes the partial light fluxes that exit from the polarization conversion element 1140 on the illuminated area. The first illuminator 102 thus outputs the light having the first polarization component.

The second illuminator 104 has a light source 110 that emits an illumination flux toward the area to be illuminated, a first lens array 2120 formed of first lenslets that divide the illumination flux emitted from the light source 110 into a plurality of partial light fluxes, a second lens array 2130 formed of a plurality of second lenslets corresponding to the plurality of first lenslets in the first lens array 2120, a polarization conversion element 2140 that converts the partial light fluxes that exit from the second lens array 2130 into partial light fluxes, each having a second polarization component, and outputs the converted partial light fluxes, and a superimposing lens 2150 that superimposes the partial light fluxes that exit from the polarization conversion element 2140 on the illuminated area. The second illuminator 104 thus outputs the light having the second polarization component.

The light source 110, the first lens array 1120, the second lens array 1130, and the superimposing lens 1150 in the first illuminator 102, as well as the light source 110, the first lens array 2120, the second lens array 2130, and the superimposing lens 2150 in the second illuminator 104 are the same as those described in the first embodiment. No detailed description thereof will therefore be made.

As described above, while the projector 16 according to the fourth embodiment differs from the projector 10 according to the first embodiment in terms of the configuration of the illuminator, the projector 16 further includes the display information processor 710 (not shown) as the pixel value generator that generates the pixel value for each of the pixels contained in each of the liquid crystal panels 1300R, 1300G, 1300B, 2300R, 2300G, and 2300B, the projection positions of which have been adjusted by the six position adjustment devices, based on the projection position of the light from that pixel, as in the projector 10 according to the first embodiment. Therefore, even when the projection position of the light from each of the pixels is shifted due to slightly insufficient accuracy present in the optical elements in the projector 16, the pixel value for each of the pixels can be generated according to the projection position of the light from each of the shifted pixels. As a result, the projector 16 according to the fourth embodiment, even when it is a megapixel projector, can prevent reduction in image quality, as in the projector 10 according to the first embodiment.

Since the projector 16 according to the fourth embodiment includes, as the illuminators, the first illuminator 102 that emits light toward the first image formation unit 1100 and the second illuminator 104 that emits light toward the second image formation unit 2100, the light from the first illuminator 102 can be used to generate the first image light and the light from the second illuminator 104 can be used to generate the second image light. The projector thus has high brightness.

Since the projector 16 according to the fourth embodiment has a configuration similar to that of the projector 10 according to the first embodiment except that the configuration of the illuminator is different, among the advantageous effects provided in the projector 10 according to the first embodiment, those relevant to the projector 16 according to the second embodiment are provided in the same manner.

Fifth Embodiment

Figure 11:
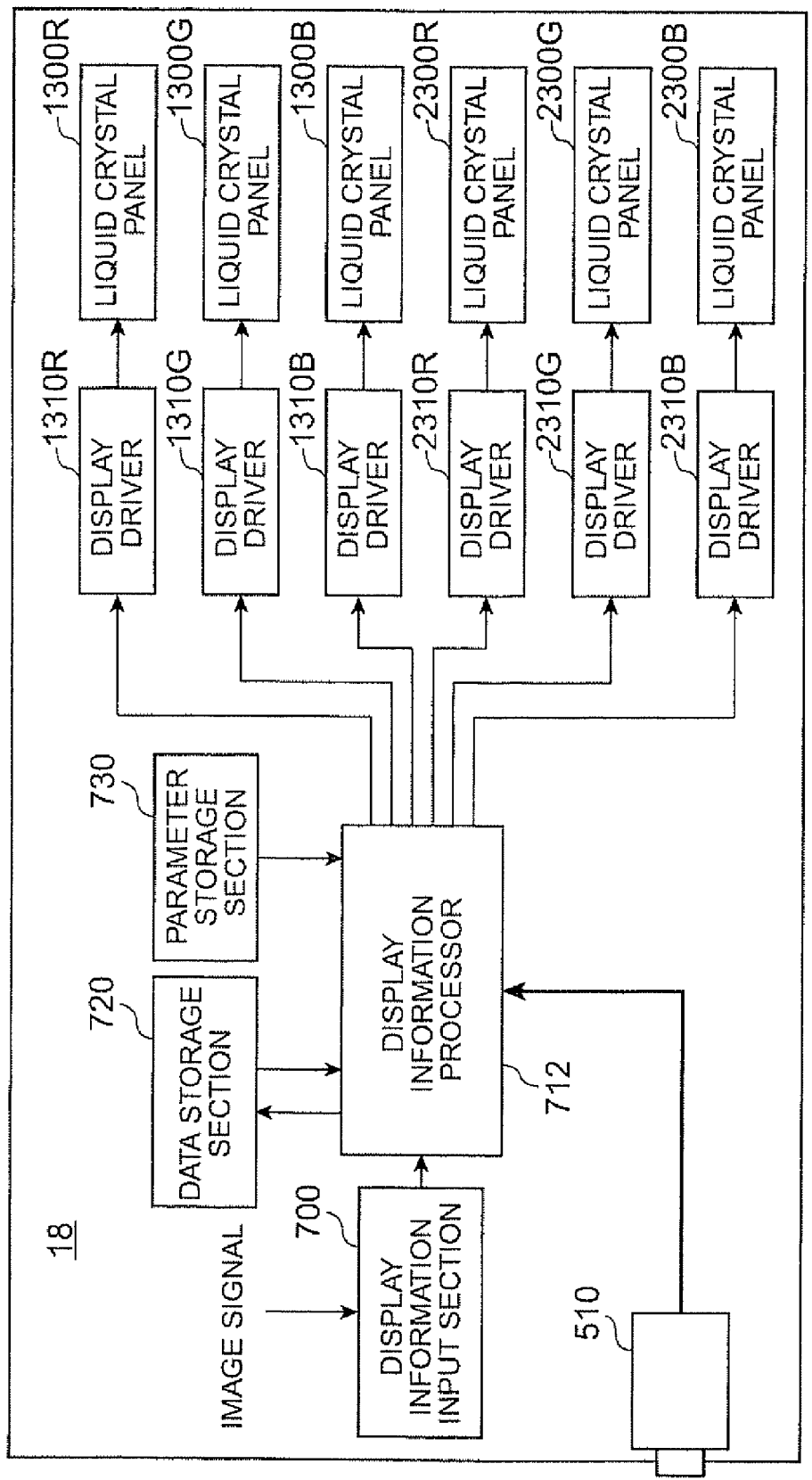
FIG. 11 explains a projector 18 according to a fifth embodiment.

FIG. 11 explains a projector 18 according to a fifth embodiment. In FIG. 1, the same members as those in FIG. 2 have the same reference numbers or characters, and no detailed description thereof will be made.

The projector 18 according to the fifth embodiment basically has a configuration fairly similar to that of the projector 10 according to the first embodiment, but differs therefrom in that the configuration of the pixel value generator is different and the imaging element is disposed in the projector.

That is, in the projector 18 according to the fifth embodiment, as shown in FIG. 11, a display information processor 712 as the pixel value generator has a pixel projection position information generation function and a parameter generation function. The pixel projection position information generation function generates, when the hypothetical screen Iw (see FIGS. 4A and 4B) including a plurality of hypothetical pixels is defined on the screen SCR, pixel projection position information on which hypothetical pixels of the plurality of hypothetical pixels receive the projected light from each of the pixels contained in each of the liquid crystal panels and how much proportion of the area of each of the light-projected hypothetical pixels receives the projected light. The parameter generation function generates a pixel value generation parameter based on the pixel projection position information generated by the pixel projection position information generation function.

The projector 18 according to the fifth embodiment further includes an imaging element 510 that images the projection position of the light from each of the pixels in each of the three liquid crystal panels 1300R, 1300G, and 1300B in the first image formation unit 1100 and the three liquid crystal panels 2300R, 2300G, and 2300B in the second image formation unit 2100.

In the fifth embodiment, since the display information processor 712 has the pixel projection position information generation function and the parameter generation function, the display information processor 712 in the projector 18 carries out the pixel projection position information generation step and the parameter generation step described in the first embodiment. That is, in the projector 18 according to the fifth embodiment, the projector 18 projects a test pattern toward the screen SCR, and the imaging element 510 images the test pattern projected on the screen SCR. The display information processor 712 then generates the pixel projection position information based on the result of the imaging operation performed by the imaging element 510, and generates the pixel value generation parameter based on the pixel projection position information.

When the projector 18 according to the fifth embodiment is used to display an image, and an image signal to be displayed is inputted to a display information input section 700, the image signal is temporarily buffered as image data in a data storage section 720 via the display information processor 712. Then, the display information processor 712 uses the pixel value generation parameter stored in a parameter storage section 730 to generate the pixel value for each of the pixels.

As described above, while the projector 18 according to the fifth embodiment differs from the projector 10 according to the first embodiment in that the configuration of the pixel value generator is different and the imaging element is disposed in the projector, the projector 18 further includes the display information processor 712 as the pixel value generator that generates the pixel value for each of the pixels contained in each of the liquid crystal panels 1300R, 1300G, 1300B, 2300R, 2300G, and 2300B, the projection positions of which have been adjusted by the six position adjustment devices, based on the projection position of the light from that pixel, as in the projector 10 according to the first embodiment. Therefore, even when the projection position of the light from each of the pixels is shifted due to slightly insufficient accuracy present in the optical elements in the projector 18, the pixel value for each of the pixels can be generated according to the projection position of the light from each of the shifted pixels. As a result, the projector 18 according to the fifth embodiment, even when it is a megapixel projector, can prevent reduction in image quality, as in the projector 10 according to the first embodiment.

Since the projector 18 according to the fifth embodiment has a configuration similar to that of the projector 10 according to the first embodiment except that the configuration of the pixel value generator is different and the imaging element is disposed in the projector, among the advantageous effects provided in the projector 10 according to the first embodiment, those relevant to the projector 18 according to the fifth embodiment are provided in the same manner.

While the projector, the projection system, and the method for generating pixel values in a projector have been described above with reference to each of the above embodiments, the invention is not limited thereto. The invention can be implemented in various other aspects to the extent that they do not depart from the spirit of the invention. For example, the following variations are possible.

In each of the above embodiments, although the pixel value generator generates the pixel value for each of the pixels contained in each of the liquid crystal panels based on the pixel projection position information on which hypothetical pixels of the plurality of hypothetical pixels receive the projected light from that pixel and how much proportion of the area of each of the light-projected hypothetical pixels receives the projected light, the invention is not limited thereto. For example, the pixel value generator may generate the pixel value for each of the pixels contained in each of the liquid crystal panels based on the pixel projection position information on which hypothetical pixels of the plurality of hypothetical pixels receive the light from that pixel and how much proportion of the light each of the light-projected hypothetical pixels receives.

In each of the above embodiments, although the description has been made of the case where the number of pixels contained in each of the liquid crystal panels is the same as the number of hypothetical pixels contained in the hypothetical screen Iw, the invention is not limited thereto. For example, the number of pixels contained in each of the liquid crystal panels may be greater than the number of hypothetical pixels contained in the hypothetical screen Iw, or the number of pixels contained in each of the liquid crystal panels may be smaller than the number of hypothetical pixels contained in the hypothetical screen Iw.

Although in the first to fourth embodiments described above, the description has been made of the case where the PC 600 as the electronic computer has the pixel projection position information generation function and the parameter generation function, and in the fifth embodiment, the display information processor 712 as the pixel value generator has the pixel projection position information generation function and the parameter generation function, the invention is not limited thereto. For example, in the configurations of the first to fourth embodiments, the PC may have the pixel projection position information generation function and the display information processor may have the parameter generation function. Further, although in the fifth embodiment, the description has been made of the case where the display information processor 712 as the pixel value generator has the pixel projection position information generation function and the parameter generation function, the invention is not limited thereto. For example, another unit having these functions may be provided in the projector.

In each of the above embodiments, although the prism-type polarization combining prism is used as the polarization combining system, the invention is not limited thereto. For example, a plate-type polarization combining system may preferably be used. As the plate-type polarization combining system, a configuration in which a polarization separation layer is provided on a light-transmissive substrate can be employed as appropriate.

In each of the above embodiments, the illuminator having an arc tube is used as the illuminator, the invention is not limited thereto. For example, an LED (light emitting diode), an LD (laser diode), or other solid state light sources can also be used as the illuminator.

In each of the above embodiments, the transmissive light modulation element (transmissive liquid crystal panel) is used as the light modulation element, the invention is not limited thereto. For example, a reflective light modulation element can also be used.

In each of the above embodiments, the liquid crystal panel is used as the light modulation element, the invention is not limited thereto. For example, a micromirror-type light modulation device can also be used.

In each of the above embodiments, the description has been made with reference to the super-megapixel projector (2K× 4K (2000 by 4000) pixels), the invention is not limited thereto. For example, the invention is applicable to a megapixel projector (a projector having 1080 by 1920 pixels and a projector having 720 by 1280 pixels, for example).

In each of the above embodiments, the description has been made with reference to the rear-type projector, the invention is not limited thereto. For example, the invention is applicable to a front-type projector.

What is claimed is:

1. A projector comprising:
    an illuminator;
    a first image formation unit including a first optical unit having a light modulation element that modulates the light from the illuminator, the first image formation unit using the first optical unit to output first image light;
    a second image formation unit including a second optical unit having a light modulation element that modulates the light from the illuminator, the second image formation unit using the second optical unit to output second image light;
    a polarization combining system that combines the first image light outputted from the first image formation unit and the second image light outputted from the second image formation unit;
    a projection system that projects image light combined by the polarization combining system;
    projection position adjusters that optically adjust projection positions of the light modulation elements on a projection surface; and
    a pixel value generator that generates a pixel value for each pixel contained in the light modulation elements, the projection positions of which have been adjusted by the projection position adjusters, based on the projection position of the light from the pixel.

2. The projector according to claim 1,
    when a hypothetical screen including a plurality of hypothetical pixels is defined on the projection surface, the pixel value generator generating the pixel value for each of the pixels contained in the light modulation elements based on pixel projection position information on which hypothetical pixels of the plurality of hypothetical pixels receive the projected light from the pixel and how much proportion of the light is projected.

3. The projector according to claim 1,
    when a hypothetical screen including a plurality of hypothetical pixels is defined on the projection surface, the projector further comprising:
        a pixel projection position information generation function of generating pixel projection position information on which hypothetical pixels of the plurality of hypothetical pixels receive the projected light from each of the pixels contained in the light modulation elements and how much proportion of the light is projected, and
        a parameter generation function of generating a pixel value generation parameter based on the pixel projection position information generated by the pixel projection position information generation function.

4. The projector according to claim 3, further comprising a parameter storage section that stores the pixel value generation parameter generated based on the pixel projection position information,
    the pixel value generator using the pixel value generation parameter stored in the parameter storage section to generate the pixel value for each of the pixels.

5. The projector according to claim 2,
    the proportion being the proportion of the area of a hypothetical pixel.

6. The projector according to claim 2,
    the proportion being the proportion of the amount of light.

7. The projector according to claim 1, further comprising an imaging element that images the projection position of the light from each of the pixels in the light modulation element in the first image formation unit and the light modulation element in the second image formation unit.

8. The projector according to claim 1,
    the first image formation unit including:
        (i) a color separation system that separates light emitted from the illuminator into three color light beams, and
        (ii) the first optical unit including, as the light modulation element, three light modulation elements that modulate the three color light beams separated by the color separation system, and a color combining system that combines the color light beams modulated by the three light modulation elements, and
    the second image formation unit including:
        (i) a color separation system that separates the light from the illuminator into three color light beams, and
        (ii) the second optical unit including, as the light modulation element, three light modulation elements that modulate the three color light beams separated by the color separation system, and a color combining system that combines the color light beams modulated by the three light modulation elements.

9. The projector according to claim 8,
    the projection position adjusters being position adjustment devices that adjust the positions of the three light modulation elements in the first image formation unit and the three light modulation elements in the second image formation unit independent of each other with respect to six axes.

10. The projector according to claim 1,
    the projection position adjusters being position adjustment devices that adjust the positions of the first optical unit and the second optical unit independent of each other with respect to six axes.

11. The projector according to claim 1,
    the projection position adjusters including one or two light shift elements disposed between the first optical unit and the polarization combining system and/or between the second optical unit and the polarization combining system.

12. The projector according to claim 1, further comprising:
    a polarization separation/light guiding system including a polarization separation system that separates the light from the illuminator into light having a first polarization component and light having a second polarization component;

a first light guiding system that guides the light having the first polarization component separated by the polarization separation system to the first image formation unit; and a second light guiding system that guides the light having the second polarization component separated by the polarization separation system to the second image formation unit.

13. The projector according to claim 1, the illuminator including a first illuminator that emits light toward the first image formation unit and a second illuminator that emits light toward the second image formation unit.

14. A projection system comprising:

(A) a projector including:
   (i) an illuminator,
   (ii) a first image formation unit including a first optical unit having a light modulation element that modulates the light from the illuminator, the first image formation unit using the first optical unit to output first image light,
   (iii) a second image formation unit including a second optical unit having a light modulation element that modulates the light from the illuminator, the second image formation unit using the second optical unit to output second image light,
   (iv) a polarization combining system that combines the first image light outputted from the first image formation unit and the second image light outputted from the second image formation unit,
   (v) a projection system that projects the image light combined by the polarization combining system, projection position adjusters that optically adjust the projection positions of the light modulation elements on a projection surface, and
   (vi) a pixel value generator that generates the pixel value for each pixel contained in the light modulation elements, the projection positions of which have been adjusted by the projection position adjusters, based on the projection position of the light from the pixel;

(B) an imaging element that images the projection position of the light from each of the pixels in the light modulation element in the first image formation unit and the light modulation element in the second image formation unit; and (C) an electronic computer having, when a hypothetical screen including a plurality of hypothetical pixels is defined on the projection surface, a pixel projection position information generation function of generating, based on the result of the imaging operation performed by the imaging element, pixel projection position information on which hypothetical pixels of the plurality of hypothetical pixels receive the projected light from each of the pixels contained in the light modulation elements and how much proportion of the light is projected, and a parameter generation function of generating a pixel value generation parameter based on the pixel projection position information generated by the pixel projection position information generation function, the pixel value generator using the pixel value generation parameter generated by the electronic computer to generate the pixel value for each of the pixels.

15. The projection system according to claim 14, the projector further including a parameter storage section that stores the pixel value generation parameter generated by the electronic computer, and the pixel value generator using the pixel value generation parameter stored in the parameter storage section to generate the pixel value for each of the pixels.

16. A method for generating pixel values in a projector including an illuminator, a first image formation unit including a first optical unit having a light modulation element that modulates the light from the illuminator, the first image formation unit using the first optical unit to output modulated first image light, a second image formation unit including a second optical unit having a light modulation element that modulates the light from the illuminator, the second image formation unit using the second optical unit to output modulated second image light, a polarization combining system that combines the first image light outputted from the first image formation unit and the second image light outputted from the second image formation unit, a projection system that projects the image light combined by the polarization combining system, projection position adjusters that optically adjust the projection positions of the light modulation elements on a projection surface, and a pixel value generator that generates the pixel value for each pixel contained in the light modulation elements, the projection positions of which have been adjusted by the projection position adjusters, based on the projection position of the light from the pixel, the method comprising in the following order:

using the imaging element to image the projection position of the light from each of the pixels in the light modulation element in the first image formation unit and the light modulation element in the second image formation unit; and using the pixel value generator to generate the pixel value for each of the pixels based on the result of the imaging operation performed by the imaging element.

17. The method for generating pixel values in a projector according to claim 16, in the generation of the pixel values, when a hypothetical screen including a plurality of hypothetical pixels is defined on the projection surface, the pixel value generator generates the pixel value for each of the pixels contained in the light modulation elements based on pixel projection position information on which hypothetical pixels of the plurality of hypothetical pixels receive the projected light from the pixel and how much proportion of the light is projected.

18. The method for generating pixel values in a projector according to claim 16, the generation of the pixel values including, when a hypothetical screen including a plurality of hypothetical pixels is defined on the projection surface, generating pixel projection position information on which hypothetical pixels of the plurality of hypothetical pixels receive the projected light from each of the pixels contained in the light modulation elements and how much proportion of the light is projected based on the result of the imaging operation performed by the imaging element, and generating a pixel value generation parameter based on the pixel projection position information generated.

19. An apparatus comprising:
an illumination unit that emits light;
a first image formation unit to which a portion of the light emitted from the illumination unit is input, the first image formation unit including:
   a first optical unit having at least one light modulation element that modulates light from the illuminator, the first optical light outputting a first image light;
a second image formation unit to which a portion of the light emitted from the illumination unit is input, the second image formation unit including:
   a second optical unit having at least one light modulation element that modulates the light from the illuminator, the second optical light outputting a second image light;
a polarization combining system that combines the first image light and the second image light and that emits a combined image light;
a projection unit that projects the combined image light;
a plurality of projection position adjusters that optically adjust the positioning of at least one of:
   (i) the at least one light modulation element of the first optical unit; and
   (ii) the at least one light modulation element of the first optical unit;
the projection position adjusters adjusting the positioning of the at least one light modulation element with respect to at least one of:
   (i) shifting the at least one light modulation element in a direction substantially parallel to at least one side of the at least one light modulation element;
   (ii) shifting the at least one light modulation element in a direction substantially perpendicular to the surface on which incident light enters the at least one light modulation element;
   (iii) rotating the at least one light modulation element around an axis which intersects the center of the at least one light modulation element, the axis extending in a direction substantially parallel to at least one side of the at least one light modulation element;
   (iv) rotating the at least one light modulation element around an axis which intersects the center of the at least one light modulation element, the axis extending in a direction substantially perpendicular to the surface on which incident light enters the at least one light modulation element; and
   (v) rotating the at least one light modulation element around an axis which lies along at least one side of the at least one light modulation element;
a pixel value generator unit that generates a pixel value for each pixel contained in the light modulation elements, the projection positions of which have been adjusted by the projection position adjusters, based on the projection position of the light from the pixel.

20. The projector according to claim 19, further comprising an imaging element that images the projection position of the light from each of the pixels in the light modulation element in the first image formation unit and the light modulation element in the second image formation unit.

21. The projector according to claim 1, wherein:
one projection position adjuster is provided for each individual color component of each of the first image light and the second image light.

22. The projector according to claim 1, further comprising:
an imaging element that detects the projection position of the light from each of the pixels in the light modulation element.

23. The projection system according to claim 14, wherein:
one projection position adjuster is provided for each individual color component of each of the first image light and the second image light.

24. The projection system according to claim 14, further comprising:
an imaging element that detects the projection position of the light from each of the pixels in the light modulation element.

25. The method for generating pixel values according to claim 16, wherein:
one projection position adjuster is provided for each individual color component of each of the first image light and the second image light.

26. The method for generating pixel values according to claim 16, further comprising:
detecting, using the imaging element, the projection position of the light from each of the pixels in the light modulation element.

27. The apparatus according to claim 19, wherein:
one projection position adjuster is provided for each individual color component of each of the first image light and the second image light.

28. The apparatus according to claim 19, further comprising:
an imaging element that detects the projection position of the light from each of the pixels in the light modulation element.

* * * * *